350-336
PM028

AU 254
XR  4,602,292

United States Patent [19]
Togashi et al.

[11] Patent Number: 4,602,292
[45] Date of Patent: Jul. 22, 1986

[54] DRIVING SYSTEM FOR MATRIX DISPLAY DEVICE

[75] Inventors: Seigo Togashi; Shigeru Morokawa, both of Tokorozawa, Japan

[73] Assignee: Citizen Watch Co., Ltd., Tokyo, Japan

[21] Appl. No.: 579,566

[22] Filed: Feb. 13, 1984

[30] Foreign Application Priority Data

Mar. 16, 1983 [JP] Japan .................. 58-42239

[51] Int. Cl.$^4$ .............................. H04N 3/14
[52] U.S. Cl. .................... 358/241; 358/236; 340/784
[58] Field of Search ............... 358/241, 236; 340/784, 340/811

[56] References Cited

FOREIGN PATENT DOCUMENTS 0048433 4/1979 Japan ..................... 358/236

Primary Examiner—James J. Groody
Assistant Examiner—E. Anne Toth
Attorney, Agent, or Firm—Sherman and Shalloway

[57] ABSTRACT

In driving system for a matrix display device which comprises display elements arranged in matrix form, row electrodes and column electrodes for driving the display elements arranged in matrix form, row electrodes and column electrodes for driving the display elements, and driving means for applying driving signals corresponding to display information into the row electrodes and column electrodes, display elements in even row and display elements in odd row are respectively driven by independent row electrode group and column electrode group thereby display of high density can be performed without using a memory circuit and without reducing the display quality.

4 Claims, 11 Drawing Figures

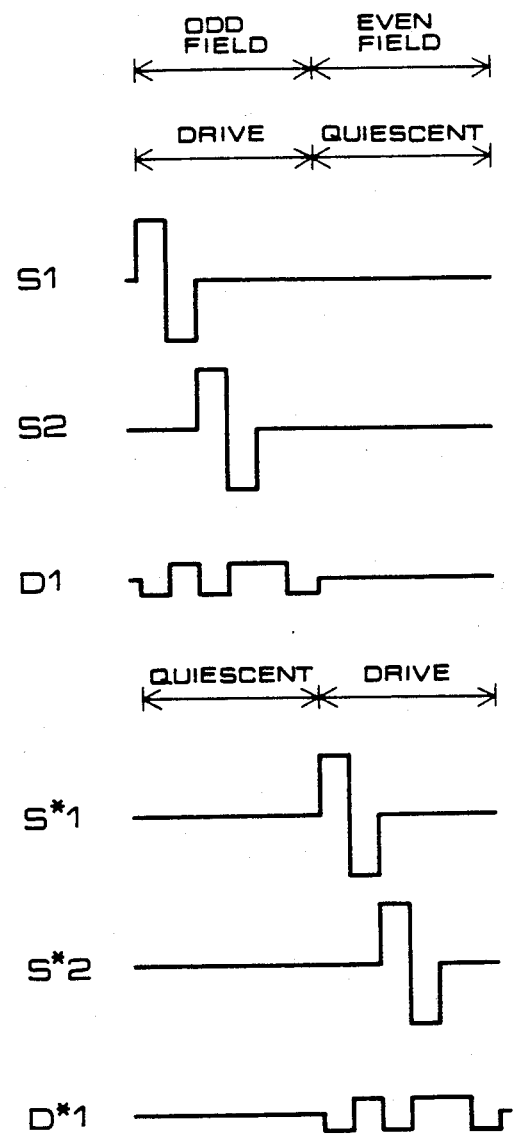

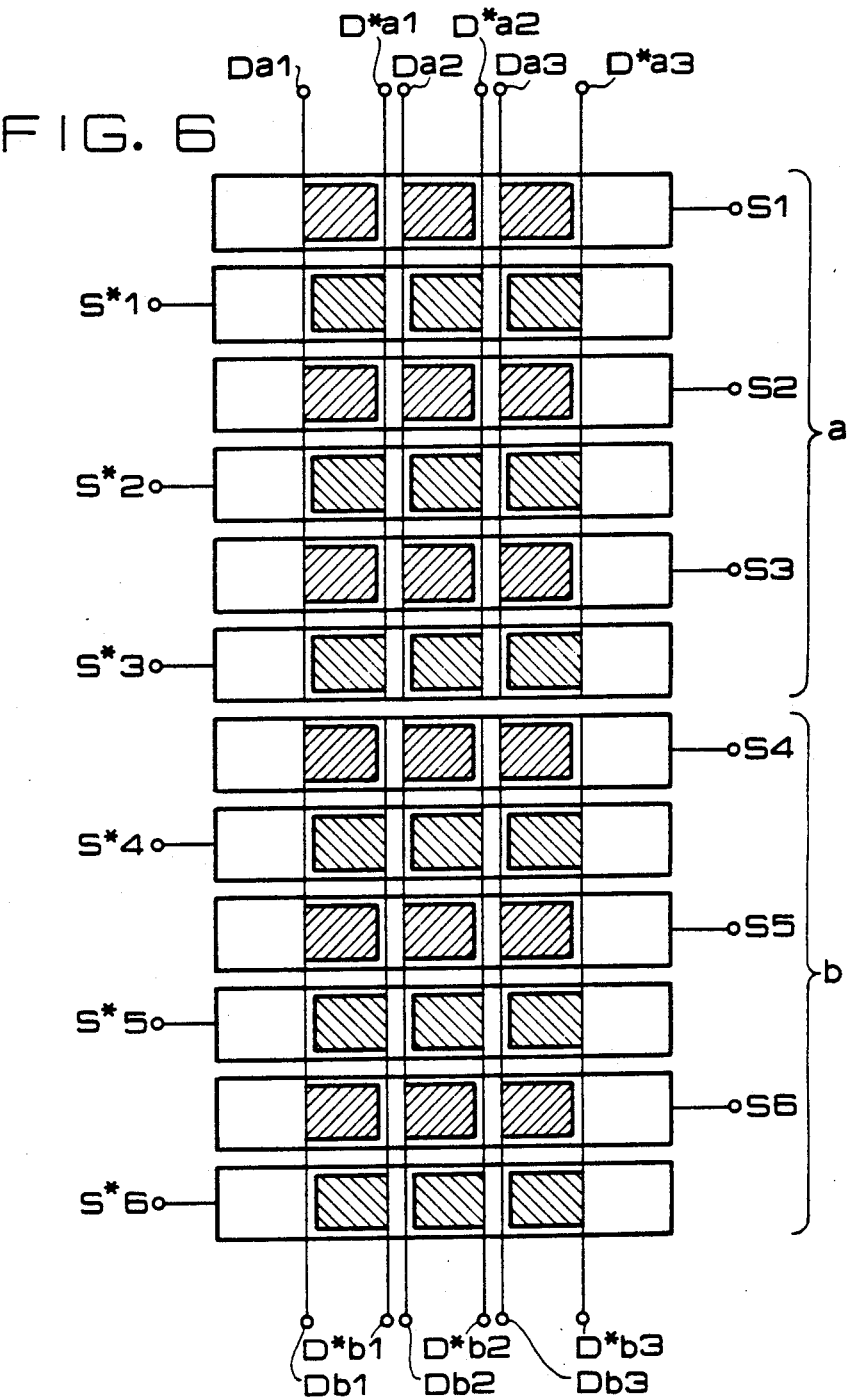

DRIVING SYSTEM FOR MATRIX DISPLAY DEVICE

BACKGROUND OF THE INVENTION

1. Field of the Invention

The present invention relates to matrix display devices, and more particularly to driving system for a matrix display device having display elements of high density.

2. Description of the Prior Art

Matrix panel display devices using liquid crystal or the like have been developed recently. These are generally classified into so-called active matrix to form active elements on a panel and passive matrix not to form them.

The former has memory function on a panel and can be multiplexed at high rate. However, technology to form the active elements of high performance uniformly throughout a large area is very difficult, and, if possible, may result in the high cost.

On the other hand, the latter has no active element but compensates low multiplexing property of the liquid crystal display element by wiring technique and driving manner only thereby it can realize density to certain degree and is low in cost. A television using passive matrix of 120 rows and 160 columns is now in practice.

Video signals for televisions are most used now among picture signals. For example, NTSC system in Japan transmits information of 525 rows halved into two fields of odd rows and even rows by means of interlaced scanning.

Since an existing liquid crystal television of 120 rows does not perform interlaced scanning but does superposition display on the same picture element by both even and odd fields, above-mentioned system is effective to about 260 lines.

However, in order to display the density more than 260 rows there is no method other than that information in the opposite field is stored in a memory and then called or that the display quality is sacrificed. In this connection, FIG. 1 shows an example of electrode arrangement of a liquid crystal display device in the prior art. In the figure, numerals $S_1$, $S_2$, $S_3$ designate row electrodes to which are applied time sharing timing signals such as $\phi_1$, $\phi_2$, $\phi_3$ shown in FIG. 2 respectively, $D_A1$, $D_A2$, $D_A3$ designate column electrodes to which is applied data signal such as $d_A1$ on the basis of display data of odd row, and $D_B1$, $D_B2$, $D_B3$ designate column electrodes to which is applied data signal such as $d_B1$ on the basis of display data of even row. The liquid crystal display element is grasped between both row and column electrodes and driven.

The display elements in FIG. 1 are arranged in 6 rows and 3 columns, but the electrodes are in 3 rows and 6 columns reversely. Such method of driving display elements of N×M in N rows and M columns by wiring technique in N/m rows and m.M columns is generally called multiple matrix. Where m represents multiplicity and FIG. 1 is an example of double matrix at m=2.

Reason why multiple matrix is used is in low multiplexing property of the liquid crystal display element. Display quality of liquid crystal, i.e. contrast or angle of view field is reduced as the multiplexing rate n is increased. Depending on the criterion, it seems that n=60 in the present and n=100 in future. Therefore at n=60 display of 120 rows is attained by double matrix and display of 480 rows is by matrix of eight times.

FIG. 3 shows another example of electrode arrangement of a liquid crystal display device in the prior art. Display elements are divided into upper half a and lower half b, and each half has the same electrode arrangement as that shown in FIG. 1 but the electrodes are taken out from either upper side or lower side in place of the alternate taking. Arrangement in FIG. 3 is referred to as so-called "up-and-down taking". Problem produced at increasing the multiplicity m is complication of the multiple wiring accompanied with reduction of the aperture ratio and increase of the manufacturing cost.

The up-and-down taking is favorable because the multiplicity in wiring being half of that in drive will do. In FIG. 3, for example, multiplicity of four times is used in drive but double up-and-down taking is used in wiring. Using this method, if display of 480 rows is attained by multiplicity of eight times in drive, it is done by up-and-down taking of multiplicity of four times in wiring.

Using above-mentioned devices in the prior art, TV display of 480 rows in full field is possible. However, if serial video signal in interlaced scanning is used as it is, problem may occur. For example, in both FIG. 1 and FIG. 3, odd row and even row are constituted by the same row electrode. Consequently either of following two methods must be performed. One method is that signal in interlaced scanning is stored in a memory and then driven by timing transformation, and other method is that in the opposite field non-effective signal is entered to data signal.

In the former, at 480 rows, 640 columns and 16 tones for example, the memory is required at large amount of more than 1 mega bits. The latter is equivalent to the drive in the double multiplexing rate thereby the display quality is reduced. In order to maintain the display quality to similar degree, the multiplicity must be doubled.

SUMMARY OF THE INVENTION

Main object of the invention is to provide a useful driving system for a matrix display device which eliminates above-mentioned disadvantages in the prior art.

Another object of the invention is to provide a driving system which enables the high density of television display in interlaced scanning without using a special memory circuit and without reducing the display quality.

Further objects and advantages of the invention will be more apparent by following description of embodiments referring to the accompanying drawings.

BRIEF DESCRIPTION OF THE DRAWINGS

FIG. 5 is a waveform chart illustrating an example of driving wave for the display device of FIG. 4;

FIG. 6 is a plan view of electrode arrangement in a liquid crystal display device as another embodiment of the invention;

DESCRIPTION OF THE PREFERRED EMBODIMENTS

Embodiments of the invention will now be described in detail referring to FIGS. 4-8.

Figure 4A:
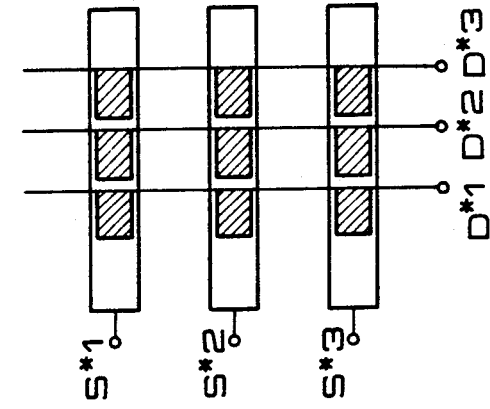
FIGS. 4a–4c is a plan view of electrode arrangement in a liquid crystal display device as an embodiment of the invention.
Figure 4B:
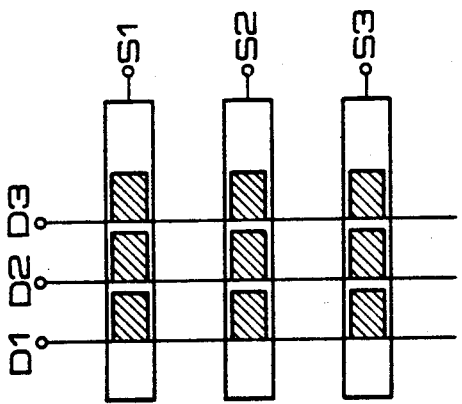
Figure 4C:
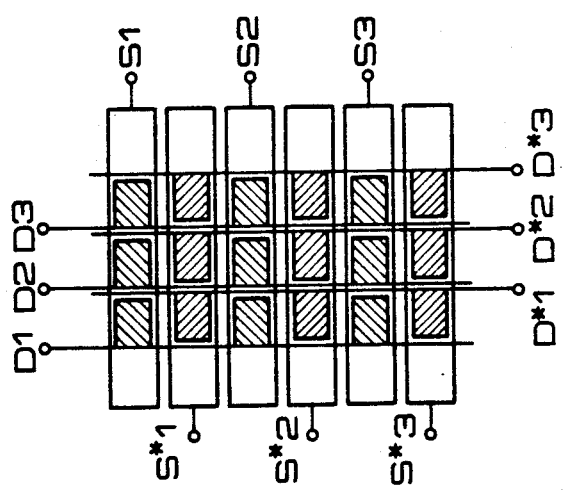

FIG. 4 is a plan view of electrode arrangement a liquid crystal display device as an embodiment of the invention. In the figure, (B) and (C) show electrode arrangement corresponding to odd rows and even rows respectively, and (A) shows electrode arrangement corresponding to superposition of above (B) and (C). That is, the display device of the invention is characterized in that display element of even row and display element of odd row are constituted by row column electrode groups being independent of each other. Consequently, display elements in N rows and M columns are driven by two independent row/column electrode groups in N/2 rows and M columns.

Such electrode arrangement of the invention is effective when the display information is transmitted using video signals of interlaced scanning type. In the field of even number, for example, display elements of even row are only in driving phase and display elements of odd row are in quiescent phase thereby an external memory may be omitted.

Driving method of the embodiment where the quiescent phase will now be described.

FIG. 5 is a waveform chart in driving the display device of the invention. Display elements of odd row are at driving phase in the odd field and likewise display elements of even row are at driving phase in the even field, and display elements in respective opposite rows are at quiescent phase.

In the odd field, for example, row electrodes $S_1$, $S_2$ of odd row are applied timing signals in time sharing manner as shown in the figure. On the other hand, column electrodes to drive display elements of odd row such as $D_1$, are applied data signals as shown in the figure thereby display elements of odd row are in driving phase.

Row electrodes such as $S^*1$, $S^*2$ of even row are applied signals identical to those in corresponding column electrodes $D^*1$, $D^*2$, $D^*3$. Signals in this case are reference potential signals, and there is no potential difference between both row and column electrodes. Such signal applying state to electrodes is called the state in quiescent phase. Adoption of the drive with quiescent phase enables to display the interlace signal as it is without using a memory circuit. That is, sequence of timing signals for selecting rows coincides with sequence of interlace signals in $S_1$, $S_2$, ... $S^*1$, $S^*2$. The multiplexing rate becomes sum of odd rows and even rows considering the timing signals only. However, since half of phase is quiescent, effective applied voltage ratio is equivalent to the case of the multiplexing rate in half.

Use of such electrode arrangement and driving method with quiescent phase enables to obtain a display device without necessitating a memory and without reducing the display quality.

FIG. 6 shows electrode arrangement in a display device as another embodiment of the invention. In the figure, display elements are divided into two regions of upper half a and lower half b. Column electrode groups to drive display elements in respective regions are connected externally from upper and lower sides. Electrode arrangement in each region is similar to that in FIG. 4.

In the embodiment of FIG. 6, four independent groups of display elements are driven by independent row-column groups. That is, first display element group of upper half and odd row is driven by first row electrode group $S_1$, $S_2$, $S_3$ and first column electrode group $D_a1$, $D_a2$, $D_a3$. Second display element group of lower half and odd row is driven by second row electrodes group $S_4$, $S_5$, $S_6$ and second column electrode group $D_b1$, $D_b2$, $D_b3$. Third display element group of upper half and even row is driven by third row electrode group $S^*1$, $S^*2$, $S^*3$ and third column electrode group $D_a^*1$, $D_a^*2$, $D_a^*3$. Further fourth display element group of lower half and even row is driven by fourth row electrode group $S^*4$, $S^*5$, $S^*6$ and fourth column electrode group $D_b^*1$, $D_b^*2$, $D_b^*3$.

Figure 1:
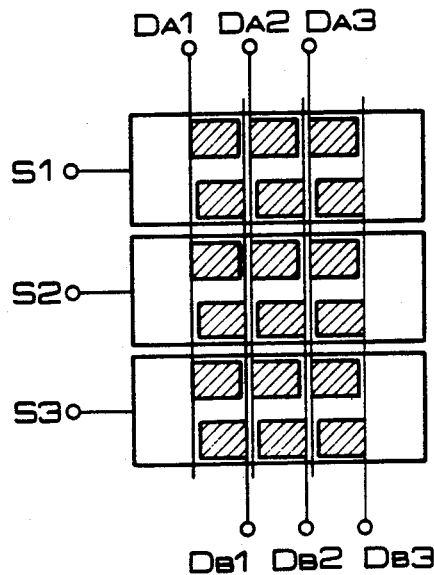
FIG. 1 is a plan view of an example of electrode arrangement of a liquid crystal display device in the prior art.
Figure 2:
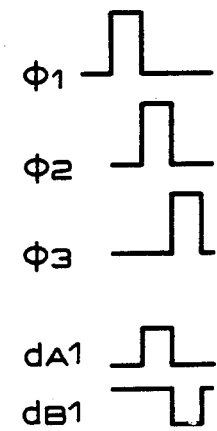
FIG. 2 is a waveform chart in driving the display device of FIG. 1.
Figure 7:
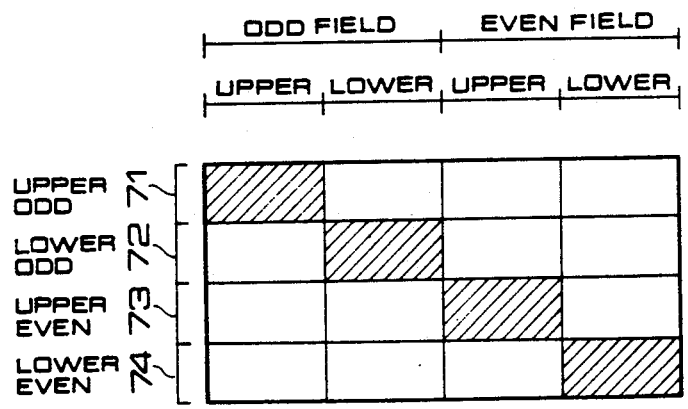
FIG. 7 is a diagram illustrating driving method of the display device of FIG. 6.
Figure 3:
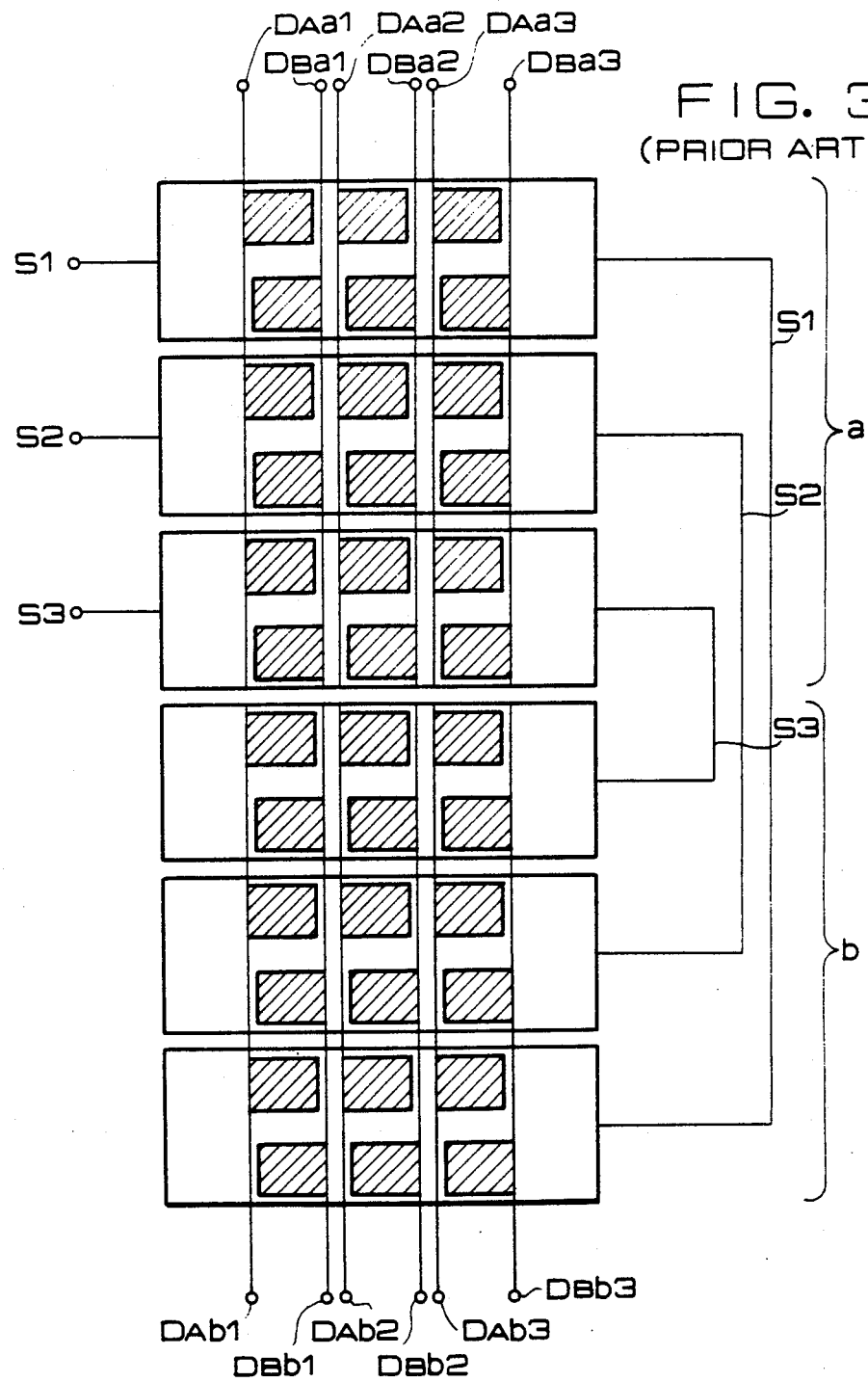
FIG. 3 is a plan view of an example of electrode arrangement of another liquid crystal display device in the prior art.

FIG. 7 is a diagram illustrating driving method of the display device in FIG. 6. In the figure, numerals 71-74 correspond to four display element groups of first to fourth, and abscissa corresponds to time. Hatched portion represents drive phase and other portion is in quiescent phase. Thus only display element groups relating to serial video signal input are in drive phase and other groups are in quiescent phase.

Figure 8:
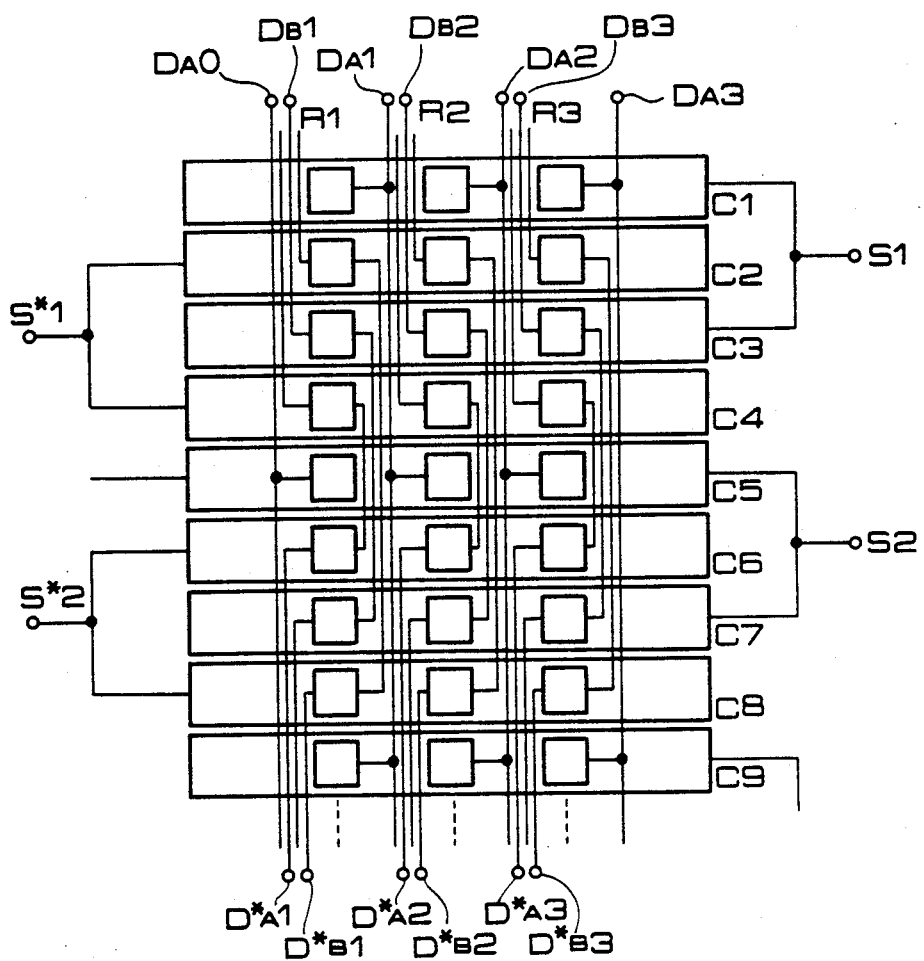
FIG. 8 is a plan view of electrode arrangement in a liquid crystal display device as still another embodiment of the invention.
Figure 9:
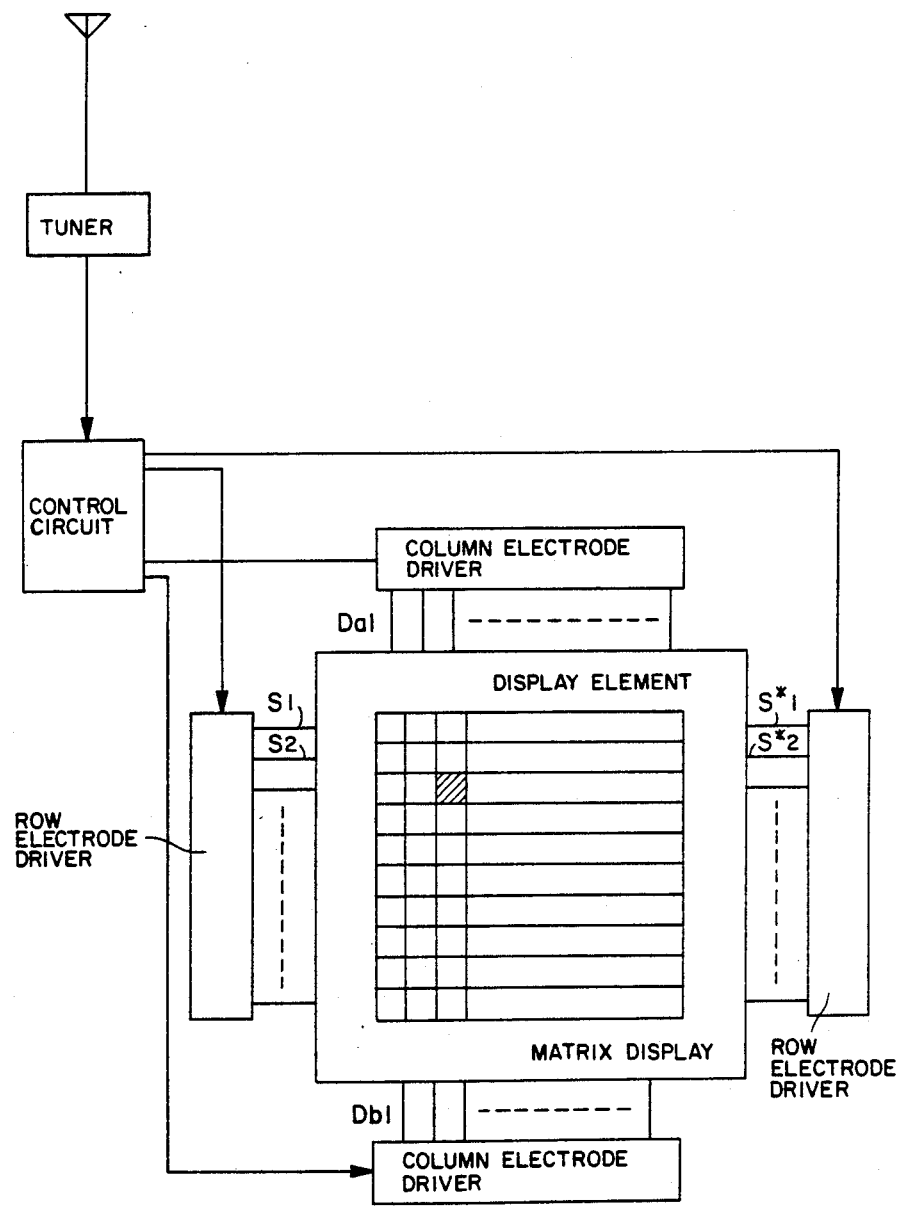
FIG. 9 is a schematic view of a display system showing the driving means thereof.

FIG. 8 is a plan view of electrode arrangement in a display device as still another embodiment of the invention. Also in third embodiment, odd rows and even rows are constituted by matrices being entirely independent of each other.

This embodiment is characterized in that a plurality of row electrodes such as $S_1$, $S_2$, $S^*1$, $S^*2$ are electrically connected in every other row and taken as a bundle externally.

In display of N rows and M columns when such electrode arrangement is adopted, display elements of N/2 rows and M columns of even or odd are taken by electrodes of N/(2.m) rows and m.M columns, thereby the electrode number hence effective number of time division may be reduced. Where m represents the connecting number of row electrodes, and m=2 in this embodiment.

Also in this embodiment, of course, up-and-down taking manner as shown in FIG. 6 is possible, and display elements are composed of four independent matrices of N/4 rows and M columns. The number of taking electrodes becomes N/(4.m) rows and M columns.

Feature of the embodiment of FIG. 8 is in column electrodes $D_A0$, $D_A1$, $D_A2$, $D_A3$. These group column electrodes drive display elements at both adjacent columns alternately per one phase although other column electrodes correspond to display elements on the same columns. In such electrode arrangement, crossing of column electrodes is unnecessary and the electrode number becomes minimum.

As above described, the present invention enables display in interlaced scanning using special electrode arrangement without necessitating a memory and has effects that multiplicity in the wiring may be reduced thereby the aperture ratio and the manufacturing cost are favorable.

Furthermore, the invention enables well a liquid crystal television of flat plane shape of about 480 rows and 640 columns in up-and-down taking manner of electrode pattern in FIG. 8, thereby a compact pocket television, a wall-hanging television, a terminal device at high density or the like can be realized.

What is claimed is:

1. Driving system for a matrix display device comprising display elements arranged in matrix form, row electrodes and column electrodes for driving said display elements, and driving means for applying driving signals corresponding to display information into said row electrodes and column electrodes, characterized in that display elements in even rows and display elements in odd rows are respectively driven by independent row electrode group and column electrode group.

2. Driving system for a matrix display device as set forth in claim 1, characterized in that the display information is transmitted to the driving means in interlaced scanning form in repetition of odd field to transmit display information of odd rows and even field to transmit display information of even rows; in the odd field, display elements in odd rows are at least partly in drive phase and display elements in even rows are in quiescent phase; and in the even field, display elements in even rows are at least partly in drive phase and display elements in odd rows are in quiescent phase.

3. Driving system for a matrix display device as set forth in claim 1, characterized in that the display elements belong to first and second regions, row electrodes for driving display elements of respective regions are externally connected from opposite sides, and when display elements in one region is in drive phase, display elements in the other region is in quiescent phase.

4. Driving system for a matrix display device as set forth in claim 1, characterized in that the display elements are liquid crystal elements of field effect type.

* * * * *